US 8,612,710 B2

(12) United States Patent
Hanson et al.

(10) Patent No.: US 8,612,710 B2
(45) Date of Patent: Dec. 17, 2013

(54) PERMISSIONS OF OBJECTS IN HOSTED STORAGE

(71) Applicant: Google Inc., Mountain View, CA (US)

(72) Inventors: David R. Hanson, Redmond, WA (US); Erkki Ville Aikas, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/764,495

(22) Filed: Feb. 11, 2013

(65) Prior Publication Data

US 2013/0219140 A1    Aug. 22, 2013

Related U.S. Application Data

(63) Continuation of application No. 13/451,939, filed on Apr. 20, 2012, now Pat. No. 8,375,185, which is a continuation of application No. 13/245,488, filed on Sep. 26, 2011, now Pat. No. 8,176,283.

(51) Int. Cl.
    *G06F 12/14*      (2006.01)

(52) U.S. Cl.
    USPC ........... 711/163; 711/152; 711/202; 711/206; 710/200; 380/264

(58) Field of Classification Search
    USPC .................. 711/152, 163, 202, 206; 710/200; 380/264
    See application file for complete search history.

(56) References Cited

U.S. PATENT DOCUMENTS

| | | | |
|---|---|---|---|
| 6,470,353 B1 | 10/2002 | Yaung et al. | |
| 6,782,218 B2 * | 8/2004 | Sekiguchi et al. | 399/81 |
| 7,266,704 B2 | 9/2007 | Levy | |
| 7,353,330 B2 | 4/2008 | Waterhouse et al. | |
| 7,647,329 B1 | 1/2010 | Fischman et al. | |
| 7,689,828 B2 | 3/2010 | Tan | |
| 8,176,283 B1 | 5/2012 | Hanson et al. | |
| 8,213,620 B1 * | 7/2012 | Sussland et al. | 380/278 |
| 8,375,185 B1 | 2/2013 | Hanson et al. | |
| 2002/0036800 A1 | 3/2002 | Nozaki et al. | |
| 2003/0056025 A1 | 3/2003 | Moses et al. | |
| 2003/0088786 A1 | 5/2003 | Moran et al. | |
| 2004/0204949 A1 * | 10/2004 | Shaji et al. | 705/1 |
| 2004/0210902 A1 | 10/2004 | Such | |
| 2007/0156842 A1 | 7/2007 | Vermeulen et al. | |
| 2008/0101605 A1 * | 5/2008 | Kitamura et al. | 380/239 |
| 2008/0109897 A1 | 5/2008 | Moran et al. | |
| 2009/0198689 A1 | 8/2009 | Frazier et al. | |

FOREIGN PATENT DOCUMENTS

| | | |
|---|---|---|
| EP | 0952698 | 10/1999 |
| EP | 1536309 | 6/2005 |

OTHER PUBLICATIONS

International Search Report and Written Opinion in International Application No. PCT/US2012/057314, mailed Feb. 27, 2013, 8 pages.

* cited by examiner

*Primary Examiner* — Jae Yu
(74) *Attorney, Agent, or Firm* — Fish & Richardson P.C.

(57) ABSTRACT

A data object is stored in a hosted storage system and includes an access control list specifying access permissions for data object stored in the hosted storage system. The hosted storage system provides hosted storage to a plurality of clients that are coupled to the hosted storage system. A request to store a second data object is received. The request includes an indicator that the first data object stored in the hosted storage system should be used as an access control list for the second data object. The second data object is stored in the hosted storage system. The first data object is assigned as an access control list for the second data object stored in the hosted storage system.

20 Claims, 7 Drawing Sheets

PERMISSIONS OF OBJECTS IN HOSTED STORAGE

CROSS-REFERENCE TO RELATED APPLICATION

This application is a continuation of U.S. patent application Ser. No. 13/451,939, filed on Apr. 20, 2012, which is a continuation of U.S. patent application Ser. No. 13/245,488, now U.S. Pat. No. 8,176,283, filed on Sep. 26, 2011, all of which are herein incorporated by reference in their entirety.

TECHNICAL FIELD

This document relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a method includes storing, in a hosted storage system, a data object. The data object includes an access control list specifying access permissions for data object stored in the hosted storage system. The hosted storage system provides hosted storage to a plurality of clients that are coupled to the hosted storage system. The method further includes receiving, in the hosted storage system, a request to store a second data object. The request includes an identifier of the first data object to be used as an access control list for the second data object. The method further includes storing, in the hosted storage system, the uploaded data object. The method further includes assigning, in the hosted storage system and to the uploaded data object, the first data object as an access control list for the second data object.

Implementations can include any, all, or none of the following features. The assigning may include copying the first data object and using the copied data object as the uploaded object access control list. The assigning may include storing a reference to the first data object, in associating with the second data object, as the second data object's access control list. The method may further include receiving, in the hosted storage system, a request to access the second data object from a user. The method may further include accessing, in the hosted storage system, the first data object using the stored reference. The method may further include determining, based on the first data object, that the user is permitted to access the second data object. The method may further include providing, to the user, access to the object. The request to store a second data object may be a Representational State Transfer (REST) formatted message. The access control list of the first data object may include XML formatted text. The hosted storage system may index the data objects stored in the hosted storage system in buckets. The access control list of the first data object may specify access permissions for one or more of the buckets.

In one aspect, a computer storage medium stores a computer program. The program includes instructions that, when executed one or more processing devices, cause the one or more processing devices to perform operations. The operations include storing, in a hosted storage system, a first data object includes an access control list specifying access permissions for data objects stored in the hosted storage system. The hosted storage system provides hosted storage to a plurality of clients that are coupled to the hosted storage system. The operations further include receiving, in the hosted storage system, a request to store a second data object. The request includes an identifier of the first data object to be used as an access control list for the second data object. The operations further includes storing, in the hosted storage system, the uploaded data object. The operations further include assigning, in the hosted storage system and to the uploaded data object, the first data object as an access control list for the second data object.

Implementations can include any, all, or none of the following features. Assigning may include copying the first data object and using the copied data object as the access control list. Assigning may include storing a reference to the first data object, in association with the second data object, as the access control list. The operations may include receiving, in the hosted storage system, a request to access the second data object from a user. The operations may include accessing, in the hosted storage system, the first data object using the stored reference. The operations may include determining, based on the first data object, that the user is permitted to access the second data object. The operations may include providing, to the user, access to the object. The request to store a second data object may be a Representational State Transfer (REST) formatted message. The access control list of the first data object may include XML formatted text. The hosted storage system may index the data objects stored in the hosted storage system in buckets. The access control list of the first data object may specify access permissions for one or more of the buckets.

In one aspect, a computer system includes a hosted storage system configured to store a first data object that includes an access control list specifying access permissions for data objects stored in the hosted storage system. The hosted storage system providing hosted storage to a plurality of clients that are coupled to the hosted storage system. The hosted storage system is further configured to receive a request to store a second data object. The request includes an indicator that the first data object stored in the hosted storage system should be used as an access control list for the second data object. The hosted storage system is further configured to store the second data object. The hosted storage system is further configured to assign the first data object as an access control list for the second data object stored in the hosted storage system. The system further includes a client system configured to send, to a hosted storage system, the request to store the second data object.

Implementations can include any, all, or none of the following features. To assign the first data object as an access control list for the second data object stored, the hosted storage system may be configured to copy the first data object and using the copied data object as the access control list. To assign the first data object as an access control list for the second data object stored, the hosted storage system may be configured to store a reference to the first data object, in association with the second data object, as the access control list. The hosted storage system may be further configured to receive a request to access the second data object from the client system. The hosted storage system may be further configured to access the first data object using the stored reference. The hosted storage system may be further configured to determine, based on the first data object, that the user is permitted to access the second data object. The hosted storage system may be further configured to provide, to the client system, access to the object. The client system may be further configured to send the request to access the second data object to the hosted storage system. The client system may be further configured to receive access to the object. The request to store a second data object may be a Representational State Transfer (REST) formatted message. The access control list of the first data object may include XML formatted text. The hosted storage system may index the data objects stored in the hosted storage system in buckets. The access control list of the first data object may specify access permissions for one or more of the buckets.

The details of one or more implementations are set forth in the accompanying drawings and the description below. Other features and advantages will be apparent from the description and drawings, and from the claims.

Various implementations of the subject matter described here may provide one or more of the following advantages. In one or more implementations, use of named access control lists can permit efficient assignment of permissions to objects in a storage system. In a hosted storage system, a single stored object can be referenced as an access control list for many other objects. A change to the referenced access control list can change the permissions for the many other objects.

DETAILED DESCRIPTION

A hosted storage system can receive, store, and server data objects to clients. The data objects can each have an access control list. Each data object and bucket can have an associated access control list that defines a list of users and their permissions with the bucket or object. The access control lists can be stored in the hosted storage system as data objects. Other data objects and buckets may reference or copy the access control list objects for use as access control lists.

Figure 1:
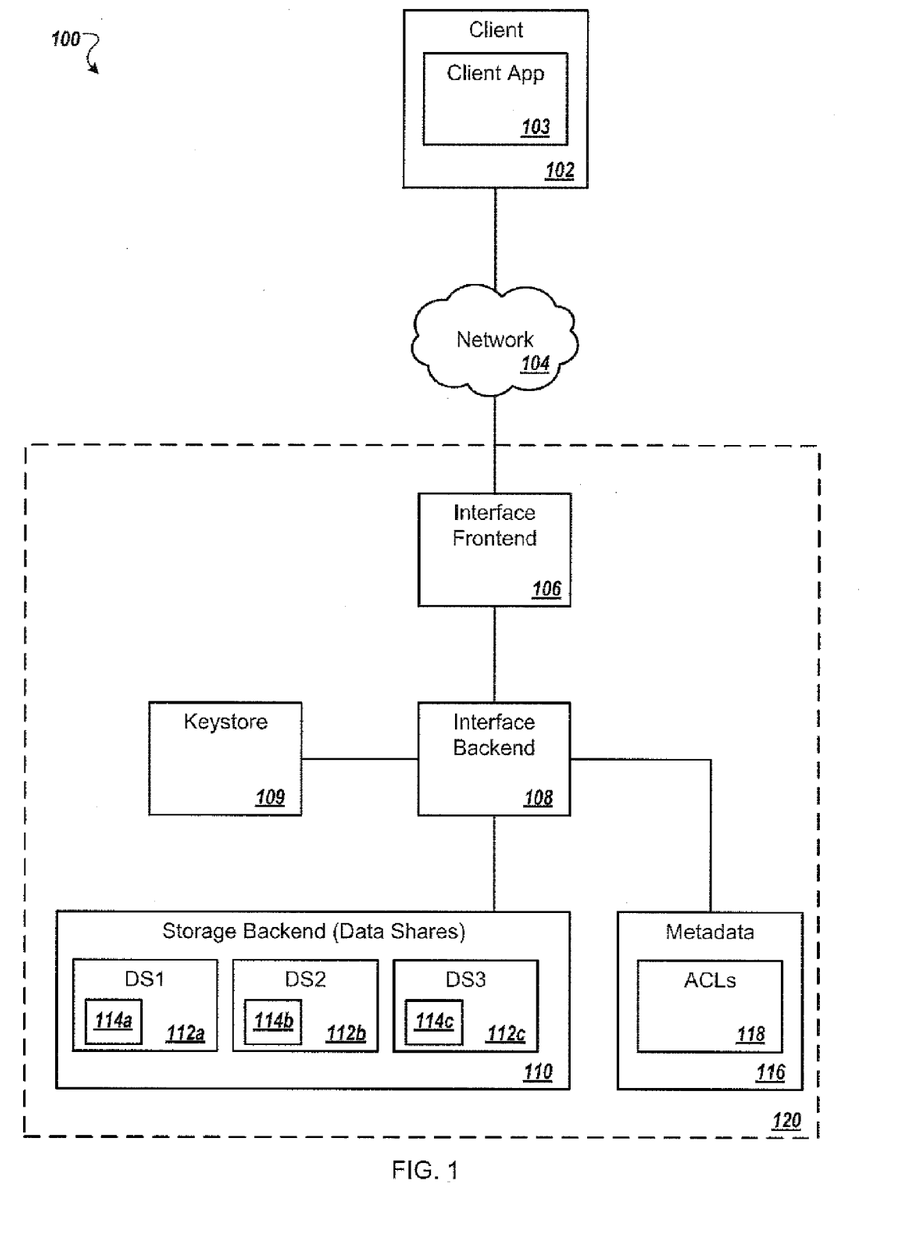
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device 102. In some implementations, a hosted storage services 120 can provide access to stored data by applications running on computing devices geographically separate from each other, provide offsite data backup and restore functionality, provide data storage to a computing device with limited storage capabilities, and/or provide storage functionality not implemented on a computing device.

The system 100 can provide scalable stores for storing data objects. The client device 102 can upload data objects to the hosted storage service 120 and control access to the uploaded data objects. Access control can include a range of security levels, from keeping data securely confidential to publishing it without restrictions. Data stored in hosted storage service 120 can be secured from unauthorized access. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for mutual business reasons (e.g., submission of work product ordered by the owner of the hosted storage service 120), or for use in data processing by other services (e.g., images uploaded are used to automatically and dynamically create a photo gallery web page.)

Figure 6:
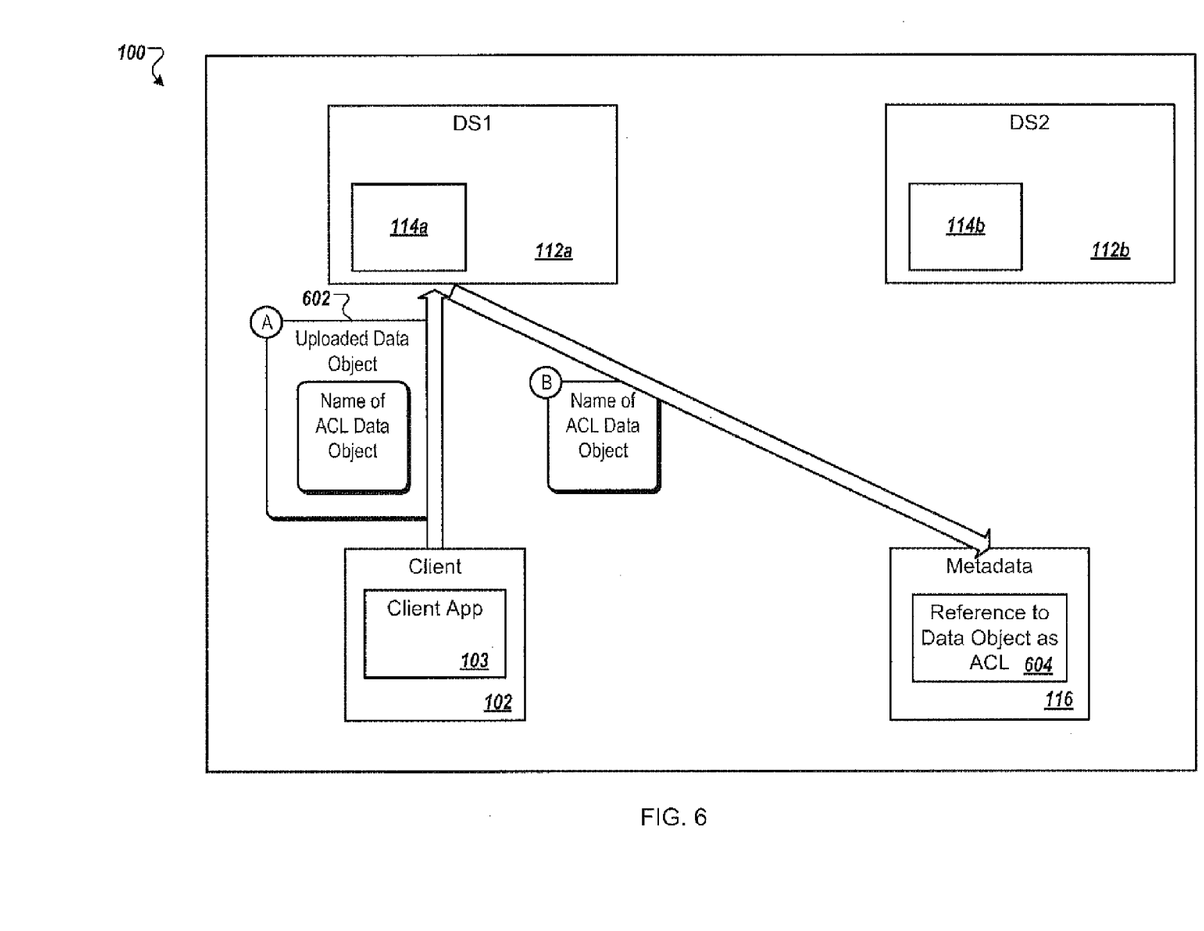

The client device 102 can be implemented using a computing device, such as the computing device 600 or the mobile device 650 described with respect to FIG. 6. The client device 102 can communicate with the hosted storage service 120 via a network 104, such as the Internet. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data objects in the hosted storage service 120. The hosted storage service 120 can be implemented by one or more server devices, which can be implemented using a computing device, such as the computing device 600 or mobile device 650 described with respect to FIG. 6. For example, the hosted storage service 120 can be implemented by multiple server devices operating in the same, or different, data centers.

The hosted storage service 120 generally includes an interface frontend 106, an interface backend 108, a storage backend 110, metadata 116 for objects stored in the storage backend 110, and a keystore 109. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 120. The PUT and POST verbs may be used to upload an object to the service 120. PUT requests can come from the client 102 and contain authentication and authorization credentials and object metadata in a header, such as an HTTP header. POST requests can be received when a client 102 wants to upload from a web browser form. The form POST upload protocol for the hosted storage service 120 can involve multiple required form fields to provide authentication, authorization and object metadata. More generally, any of the API requests may include credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 120 (e.g., if the organization operating the hosted storage service 120 also operates other web services such as email service.) A user can also or alternatively be authenticated based on authentication credentials from an external credentialing service or an external service that includes credentialing functionally. User or group identifier information can be calculated from the external service's credential information. Requests sent by the client 102 to the interface frontend 106 can be translated and forwarded to the external service for authentication.

In general, objects stored in the hosted storage service 120 can be referenced by object identifiers. The hosted storage service 120 can define namespaces to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers.

Objects can be stored in hosted storage service 120 in buckets. In some examples, each bucket is uniquely named in the hosted storage service 120, each object is uniquely named in a bucket, and every bucket and object combination is unique. Objects may be uniquely identified by a URI that includes the bucket name and the object name, and identifies the hosted storage service 120. For example, an object named "long/song.mp3" in a bucket named "music" could be specified using a URI pattern such as http://s.hostedstoragesystem.com/music/long/song.mp3 or http://music.s.hostedstoragesystem.com/long/song.mp3. Alternatively, the user of the client 102 can create a bucket named www.music.org, publish a CNAME alias redirecting that to http://music.s.hostedstoragesystem.com, and address the object as http://www.music.org/long/song.mp3. In some examples, buckets do not nest.

The interface backend 108 can handle request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted.) The interface backend can also provide encryption and decryption services to prevent unauthorized access to data, even by internal users.

A keystore 109 can store encryption keys for data objects, where the encryption keys have themselves been encrypted by the interface backend 108. The encrypted keys can carry associated metadata that is cryptographically bound to the key itself, and are referred here to as wrapped keys. From the point of view of the interface backend 108, the wrapped keys can be opaque objects. To obtain the cleartext key of a wrapped key for use (e.g., to encrypt or decrypt a data object) the interface backend 108 can provide the wrapped key and client authentication credentials to the keystore 109. The keystore 109 can verify, based in part on the wrapped key's metadata, that the provided authentication credential is sufficient to authorize release of the key, and if so, can return the unwrapped key to the interface backend 108. The interface backend 108 can use the key to encrypt or decrypt the data object and then can discard the key.

In some examples, the encryption key is a symmetric key that can be used to both encrypt and decrypt an object. In some examples, a wrapped key can have associated metadata indicating multiple users or groups authorized to access the cleartext key. In some examples, the keystore 109 can copy a wrapped key and rewrap the key for a different principle (e.g., containing different metadata).

The interface backend 108 can manage metadata 116 associated with data objects, for example in a structured data format such as a database (e.g., MySQL or BigTable). User-specified names labeling the buckets can be completely defined within the metadata 116, and object metadata 116 can map a resource name to one or more data shares 112 storing the resource. The metadata 116 can also contain bucket and object creation times, object sizes, hashes, and access control lists 118 (ACL 118) for both buckets and objects. The interface backend 108 can log activity and track storage consumption to support accounting for billing and chargebacks. In some examples, this include quota monitoring in each dimension in which customers are charged (e.g., reads, writes, network transfers, total storage in use.)

The ACLs 118 define who is authorized to perform actions on corresponding buckets or objects, and the nature of the permitted actions. The ACLs 118 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Object Roles below shows a list of example roles that can be included in ACLs 118 for data objects.

TABLE 1

Bucket Roles

| Role | Capabilities |
|---|---|
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
|---|---|
| READ | Can read the object. |
| FULL_CONTROL | READER capabilities plus ability to read and write the object ACL. |

Scopes can be defined to a single user or a group of users. In one implementation, those users with a FULL_CONTROL role (and therefore able to modify the ACL for a given bucket or object) may define a group of users, and then provide a role for the group. For example, a group of users may be managed by the hosted storage service 120 (or, more generally, by the service provider that provides the hosted storage service 120) for reasons other than storage permissions (for example, Google Groups at groups.google.com) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group.

Table 3: Scopes below shows a list of example scopes that can be included in ACLs 118 for buckets and/or data objects.

TABLE 3

Scopes

| Name | Description |
|---|---|
| Service ID | A single authenticated user specified by username. |
| Email Address | A single user specified by an email address. |
| Service Group ID | A group of users managed by the hosted storage service 120 and specified by an associated identifier. |
| Invite Token | One or more users with access to a one time use digital token. |

TABLE 3-continued

Scopes

| Name | Description |
|---|---|
| Group-Restricted Key | One or more users with access to a permanent use digital key. |
| All Service Users | All authenticated users of the hosted storage service 120. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 118 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 118. In some examples, it is possible to create an object that the bucket owner cannot read.

The storage backend 110 can contain multiple datastores 112a-112c. Although three datastores 112 are shown, more or fewer are possible. Each of the datastores 112a-112c can store data objects 114a-114c in a particular format. For example, data store 112a can store a data object 114a as a Binary Large Object (BLOB), data store 112b can store a data object 114b in a distributed file system (e.g., Network File System, Google File System), and data store 112c can store a data object 114c in a structured data format such as a database (e.g., MySQL, BigTable.)

Figure 2:
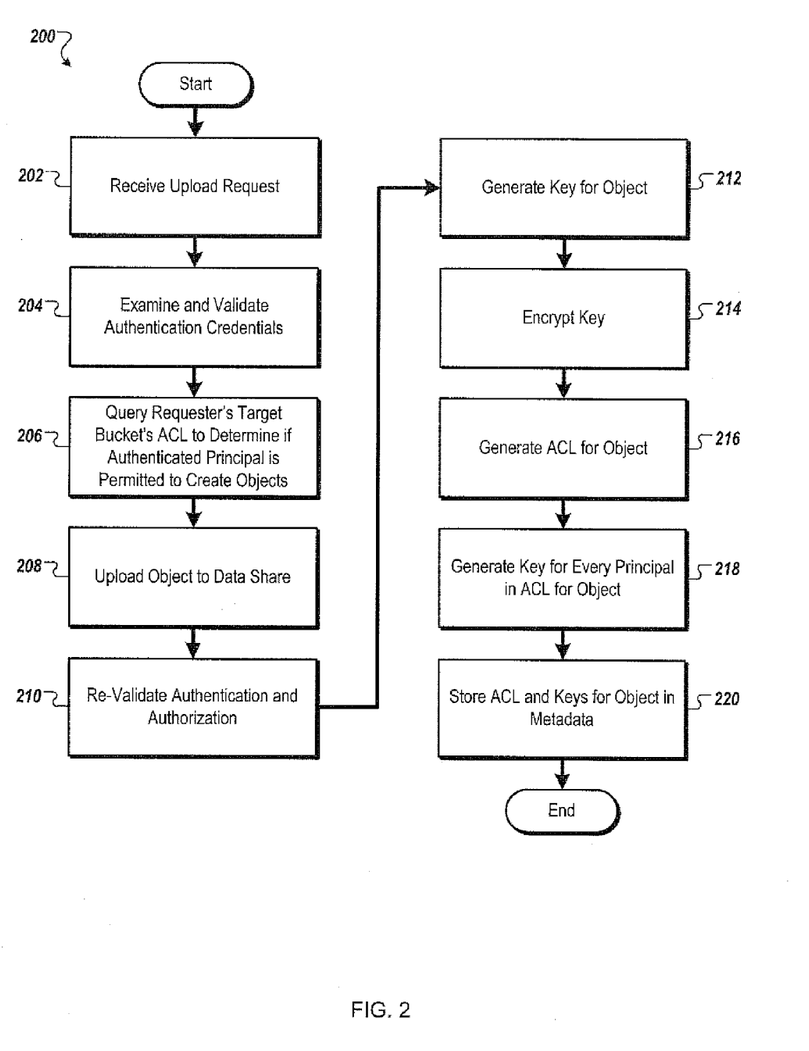
FIG. 2 is a flow chart showing an example of a process for storing data in a hosted storage service.

FIG. 2 is a flow chart showing an example of a process 200 for storing data in a hosted storage service. The process 200 can be performed by, for example, the interface frontend 106 and the interface backend 110, and for clarity of presentation, the description that follows uses the system 100 as the basis for describing the process. However, another system, or combination of systems, may be used to perform the process 200.

A request is received by the interface frontend 106 from the client application 103 to store an object (202). The request can include a HTTP PUT or POST request, an authentication credential that authenticates the principal (entity) making the request, a data object, and a target for the object consisting of a bucket and data object name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage service 120. External credentials (e.g., user names and passwords for another system) can be sent to the associated external system for validation.

The interface backend 108 can query the request's target bucket's ACL 118 to determine if the authenticated principal is permitted to create an object in the bucket (206). For example, the principal or a group the principal is a member of can have the WRITE or FULL_CONTROL role assigned in the bucket's ACL 118, which would allow the principal to create an object in the bucket. If the principal is not authorized to create an object, the request is denied.

Otherwise, the interface backend 108 uploads the object to the target bucket with the target data object name to a datastore 112 (208). In some examples, each bucket is associated with only a single datastore 112, and specifying a target bucket specifies a datastore 112. In some examples, the interface backend 108 can examine the data object or use a parameter in the RPC from the interface frontend 106 to determine which datastore 112 to store the object in, with associated metadata 116 indicating the location of the object (that is, the particular datastore the object is stored in and the object's location in that datastore).

The interface backend 108 re-validates the principal's authentication and authorization (210). To support long-running uploads, expiry times of authentication credentials can be temporarily ignored.

The interface backend 108 generates a new document key request to the keystore 109 for a wrapped key for the newly-uploaded object (212). The new wrapped key is tied to the authentication credentials of the principal of the request. The keystore 109 can also supply an encryption key to encrypt the wrapped key. The interface backend 108 encrypts the wrapped key (214).

The interface backend 108 creates an ACL 118 representing the access control list for the newly created object (216). In some example, a default ACL 118 is used or an ACL 118 can be specified by the request from the client 102.

The interface backend 108 generates a new document key request to the keystore 109 for a wrapped key for every principal (user or group) in the ACL 118 with permissions to read the object or modify the object's ACL 118. Each new wrapped key is tied to a single principal. The keystore 109 can also supply an encryption key to encrypt the wrapped keys, or the interface backend 108 can reuse the encryption key from the step 108.

The interface backend 108 stores the object's ACL 118 and wrapped keys in the object's metadata 116. The encryption key or keys can be discarded by the interface backend 108.

Figure 3:
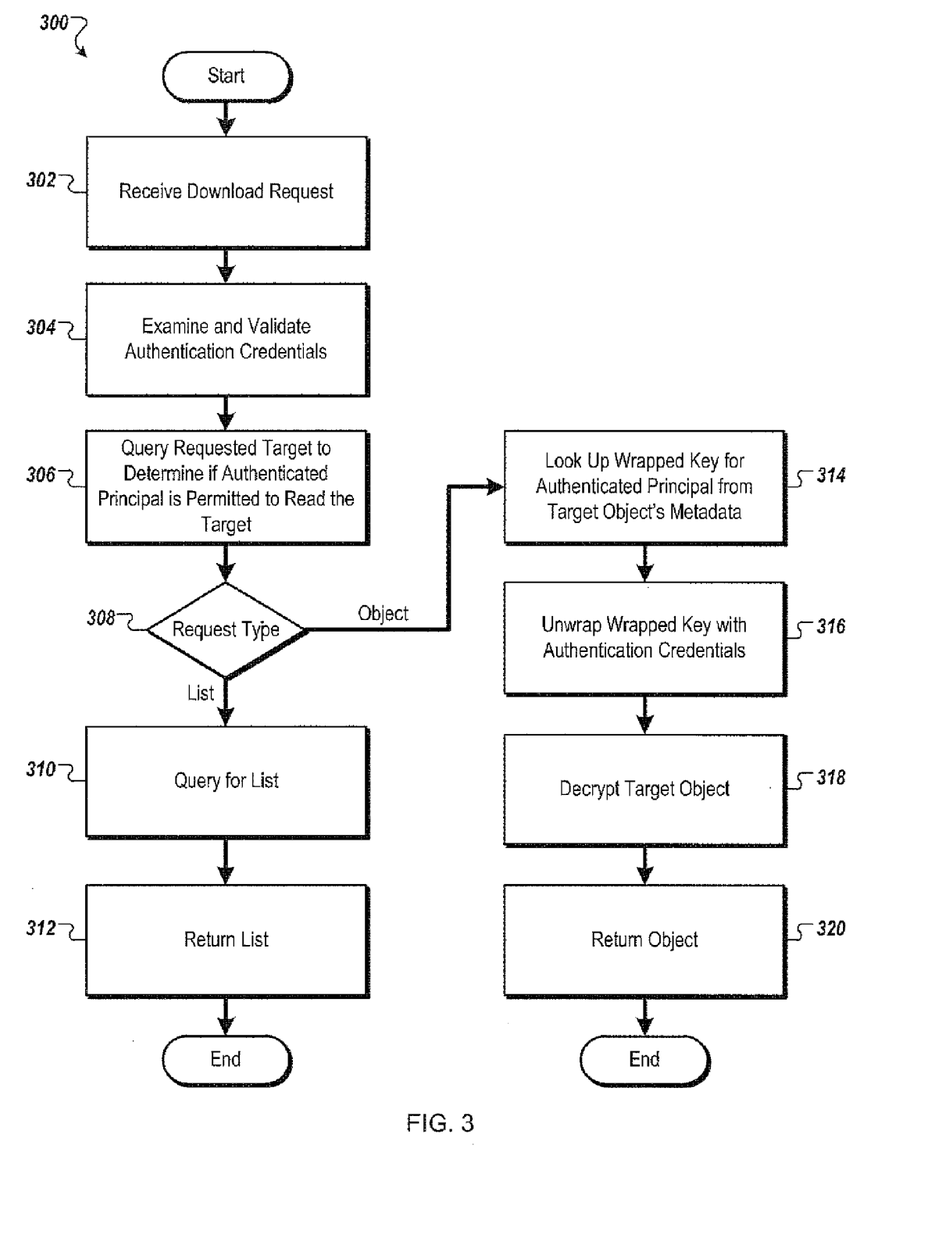
FIG. 3 is a flow chart showing an example of a process for providing data in a hosted storage service.

FIG. 3 is a flow chart showing an example of a process for providing data in a hosted storage service. The process 300 can be performed by, for example, the interface frontend 106 and the interface backend 110, and for clarity of presentation, the description that follows uses the system 100 as the basis for describing the process. However, another system, or combination of systems, may be used to perform the process 300.

A request is received by the interface frontend 106 from the client application 103 to download an object (302). The request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage service 120. External credentials (e.g., user names and passwords for another system) can be sent to the associated external system for validation.

The interface backend 108 queries the request's bucket or object ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the object, the request is denied.

Otherwise, the interface backend 108 determines if the request is for a bucket or for an object (308). If the request is for a bucket, the interface backend 108 queries for a list of the bucket's contents (310) and the listing is returned to the client application 103 (312).

If the request is for an object, the interface backend 108 looks up the appropriate wrapped key for the given authenticated requestor from the object's metadata 116 (314). The interface backend 108 sends the wrapped key and the authentication credentials to the keystore 109, which can return the decrypted object encryption key to the interface backend 108 (316). The interface backend 108 can fetch and decrypt the target object (318) to be returned to the client application 103 (320).

Figure 4:
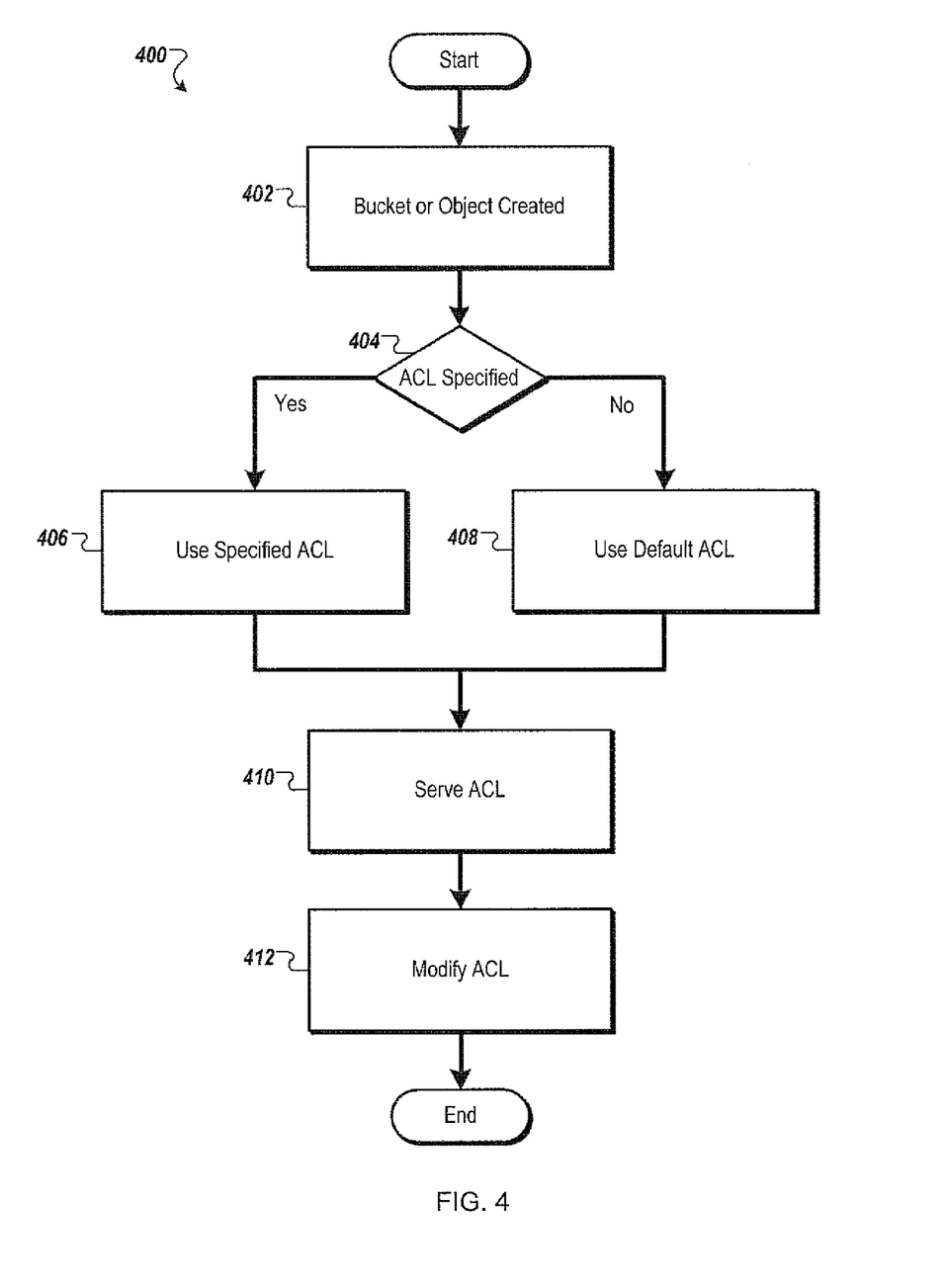
FIG. 4 is a flow chart showing an example lifecycle of an access control list.

FIG. 4 is a flow chart showing an example lifecycle 400 of an ACL 118. Although the steps of the lifecycle 400 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or object is created by the backend interface 108 based on requests from the client application 103 (402). The client request can include a bucket name, an object name, and/or an ACL 118. The principal requesting the new bucket or object is authenticated and made the owner of the bucket or object.

If an ACL 118 is specified in the request (404), the specified ACL 118 is associated with the bucket or object (406). If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" ACL. A list of pre-specified or "canned" ACLs 118 is shown in Table 4 Canned ACLs below. The canned ACLs 118 can be cataloged by the hosted storage system 120 and referenced by the client application 103 by name, rather than requiring the request enumerate each scope and role pair. Additionally, ACLs may be generated by a client, stored in the hosted storage system 120, and specified in the request. These ACLs, sometimes referred to as named ACLs, may be referenced according to the same scheme as other data objects stored by the hosted storage system 120 (e.g. bucket and object name).

TABLE 4

Canned ACLs

| Canned ACL Name | {scope, permission} |
| --- | --- |
| private | {creating user or bucket owner, FULL_CONTROL} |
| public-read | {all users, READ} |
|  | {bucket owner, FULL_CONTROL} |
| public-read-write | {all users, WRITE} |
|  | {bucket owner, FULL_CONTROL} |
| authenticated-read | {all authenticated users, READ} |
|  | {bucket owner, FULL_CONTROL} |
| bucket-owner-read [for objects only] | {bucket owner, READ} {object owner, FULL_CONTROL} |
| bucket-owner-full-control [for objects only] | {bucket owner, FULL_CONTROL} {object owner, FULL_CONTROL} |

If an ACL 118 is not specified in the request (404), a default ACL 118 can be used (408). For example, bucket and object creation can default to the "private" canned ACL 118 for authenticated users. For object creation by unauthenticated users, such as for new objects created in a "public-read-write" bucket, a default of "bucket-owner-full-control" can be used.

An ACL 118 can be served, for example, to a principal with READ, WRITE, or FULL_CONTROL of the associated bucket or object (410). For example, a client application 103 can perform a HTTP GET to a target's URI with the query string ?acl to retrieve the ACL associated with the target. The ACL 118 can be serialized and returned to the client application 103.

The serialization may be defined, for example, by the following extended Backus-Naur form. Nonterminals appear in sans serif italics, terminals appear in Courier Bold, { } denote zero or more repetitions, [ ] enclose optional entities, | separates alternatives, and ( ) denote grouping. The terminal symbols canonical-id, email-address, and domain are defined in English below:

```
access-control-list: <AccessControlList> [ owner ] entries
</AccessControlList>
owner: <Owner> id </Owner>
entries: <Entries> { entry } </Entries>
entry: <Entry> ( permission scope | scope permission ) </Entry>
permission: <Permission> ( READ | WRITE | FULL_CONTROL )
</Permission>
scope: <Scope type=UserById> id </Scope>
| <Scope type=UserByEmail> email </Scope>
| <Scope type=GroupById> id </Scope>
| <Scope type=GroupByEmail> email </Scope>
| <Scope type=GroupByDomain> <Domain> domain </Domain>
</Scope>
| <Scope type=AllUsers/>
| <Scope type=AllAuthenticatedUsers/>
id: <ID> canonical-id </ID> [ <Name> text </Name> ]
| [ <Name> text </Name> ] <ID> canonical-id </ID>
email: <EmailAddress> email-address </EmailAddress> [ <Name> text
</Name>]
| [ <Name> text </Name> ] <EmailAddress> email-address
</EmailAddress>
``` text: { printable character excluding < and > }
canonical-id: 64 hex digits
email-address: standard RFC 822 email address
domain: standard RFC 822 domain specification A canonical-id or an email-address can identify a user or a group. A canonical-id is the encrypted service id for the user or group. Email addresses are a convenience for specifying canonical ids. In some implementations, the ACLs returned from the system always contain canonical ids. The <Name> text</Name> element may be used for information purposes only such that it is otherwise ignored by the system, and the system does not return it if there is no public name associated with the user or group.

An example serialized ACL 118 is shown below.

```
<AccessControlList>
<Owner>
<ID>a9a7b886d6fd24a52fe8ca5bef65f89a64e0193f23000e241bf9b1c61be666e9</ID>
<Name>chriscustomer</Name>
</Owner>
<Entries>
<Entry><Permission>FULL_CONTROL</Permission>
<Scope type=UserById>
<ID>a9a7b886d6fd24a52fe8ca5bef65f89a64e0193f23000e241bf9b1c61be666e9</ID>
<Name>chriscustomer</Name>
</Scope>
</Entry>
<Entry><Permission>FULL_CONTROL</Permission>
<Scope type=UserById>
<ID>79a59df900b949e55d96a1e698fbacedfd6e09d98eacf8f8d5218e7cd47ef2be</ID>
<Name>Frank</Name>
</Scope>
</Entry>
<Entry><Permission>FULL_CONTROL</Permission>
<Scope type=UserById>
<ID>de019164ebb0724ff67188e243eae9ccbebdde523717cc312255d9a82498e394a</ID>
<Name>Jose</Name>
</Scope>
</Entry>
<Entry><Permission>READ</Permission><Scope type=AllUsers></Entry>
</Entries>
</AccessControlList>
```

An ACL 118 can be updated, for example by a principal with WRITE or FULL_CONTROL of the associated bucket or object (412). In some examples, a client must read, modify, and write an ACL 118 in order to update an ACL 118. In this example, the ACL 118 is served (410) as part of modification (412). In some implementations, a client application 103 can send ACL update requests to the hosted storage system 120.

Figure 5:
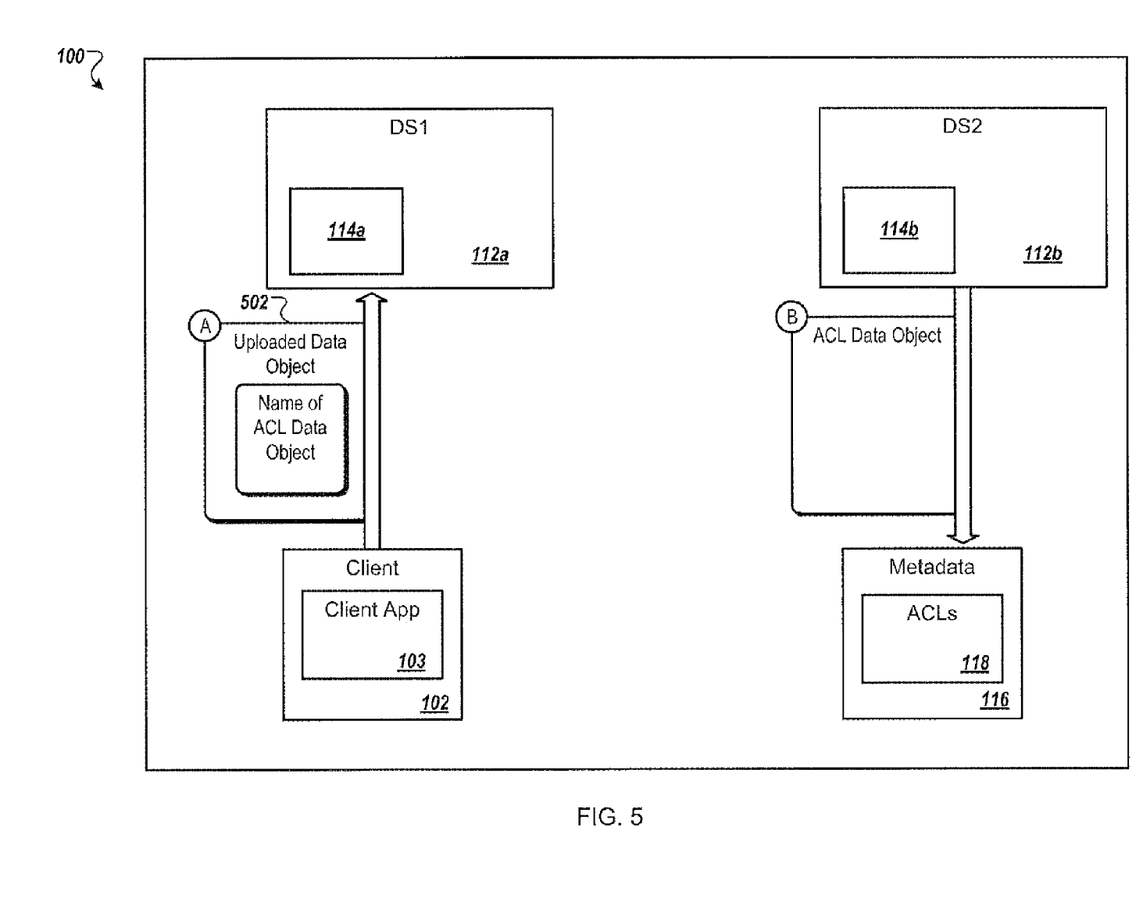
FIGS. 5 and 6 are flow diagrams showing example of using stored data objects as access control lists.

FIG. 5 is a flow diagram showing an example of an operation of system 100 when stored data objects are used for access control lists. In the operations shown in FIG. 5, named ACL data objects are copied to create ACLs 118

In some implementations, some ACLs can be stored as a data object. These data object ACLs can contain the same type of data as the ACLs 118, for example XML formatted text that specifies permission for objects or buckets in the hosted storage system 120. When the data object 114*a* is uploaded to the hosted storage system 120, the upload request 502 may include a header that specifies a second data object 114*b* to be used as the ACL 118 for that uploaded data object 114*a*. Additionally, data objects maintained in storage with ACLs 118 may have permissions modified to use an ACL data object, such as object 114*b*. For example, a user administering one such data object may decide that the current ACL for that data object is no longer desired. The user may choose to modify that data object's ACL, or may choose to assign the object 114b as the data object's new ACL.

The hosted storage system 120 can store the newly uploaded data object 114a and assign the ACL data object 114b as the ACL 118. The data in the ACL data object 118b can be copied and stored as an ACL 118 in the metadata 116. In this case, a change to the ACL 118 may be made independent of, and without affecting, the ACL data object 114b.

A header field in a message 502 can specify that the ACL data object 114b should be copied and used to create the ACL 118. For example, a multi-purpose header (e.g. x-storage-acl), which can be used for any kind of ACL 118, or a header specific to use of a stored object as an ACL (e.g. x-storage-custom-acl) may be used to specify the ACL data object 114b. The header may include the fully qualified name of the ACL data object 114b according to the naming convention used by the hosted storage system 120 for all data objects (e.g. bucket/object). The uploading of the data object 114a and the copy and assignment of the ACL data object 114b as the ACL 118 may be performed as part of a single, atomic action. That is, before the data object 114a is available the client application 103 or any other requester, the ACL 118 is created from the ACL data object 114b.

FIG. 6 is a flow diagram showing an example of an operation of system 100 when storing data objects as access control lists. In the operations shown in FIG. 6, named ACL data objects are used as ACLs, and a reference 604 to the ACL data objects are stored in the metadata 116. In some implementations, use of such a reference may involve fetching a named ACL data object and parsing the contents (e.g. XML data) when a data object with such a reference is accessed.

In some implementations, some ACLs can be stored as a data object. These data object ACLs can contain the same type of data as the ACLs 118, for example XML formatted text that specifies permission for objects or buckets in the hosted storage system 120. When the data object 114a is uploaded to the hosted storage system 120, the upload request 602 may include a header that specifies a second data object 114b to be used as the ACL for that uploaded data object 114a. Additionally, existing data objects stored with ACLs 118 may be modified to use an ACL data object, such as object 114b.

The hosted storage system 120 can store the newly uploaded data object 114a and assign the ACL data object 114b to be used as the ACL. The data in the ACL data object 114b can identified in a referenced 604 in the metadata 116 of the data object 114a. In this case, a change to the ACL 114b may be made, resulting in an effective change to the permissions of the data object 114a and any other data object using the data object 114b as an ACL.

A header field in a message 502 can specify that the ACL data object 114b should be referenced 604 in the metadata 116 for use as an ACL. For example, a multi-purpose header (e.g. x-storage-acl), which can be used for any kind of ACL 118, or a header specific to use of a stored object as an ACL (e.g. x-storage-custom-acl) may be used to specify the ACL data object 114b. The header may include the fully qualified name of the ACL data object 114b according to the naming convention used by the hosted storage system 120 for all data objects (e.g. bucket/object).

The interface backend 108 can receive a request to access the data object 114a. In this example, accessing can include reading, writing, listing, deleting, or other actions. The interface backend can dereference the reference 604 to identify the ACL data object 114b to determine if the user that sent the request is permitted to access the data object 114a. If the user does have sufficient permissions, the interface backed 108 can provide the data object 114a to the user. If the user does not have sufficient permissions, the interface backend 108 can instead send an access denied message indicating that the user lacks the correct permissions.

Figure 7:
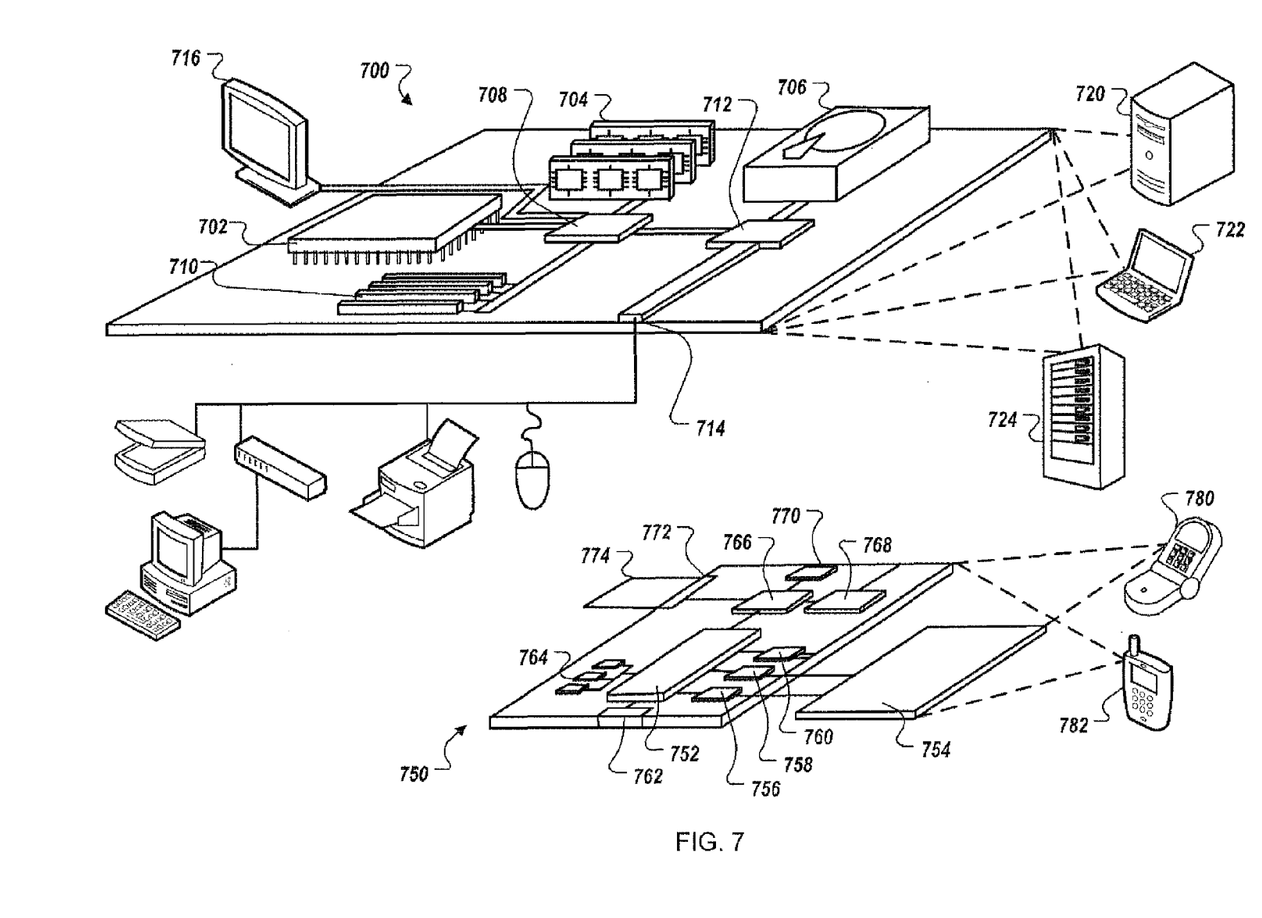
FIG. 7 shows an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a microdrive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method performed by one or more processors, the method comprising:
    storing, in a hosted storage system, a first data object comprising an access control list specifying access permissions for data objects stored in the hosted storage system, the hosted storage system providing hosted storage to a plurality of clients that are coupled to the hosted storage system;
    receiving, in the hosted storage system, a request to store a second data object;
    storing, in the hosted storage system, the second data object;
    receiving, in the hosted storage system after storing the second data object, a request including an indicator that the first data object stored in the hosted storage system should be used as an access control list for the second data object; and
    assigning, in the hosted storage system, the first data object as an access control list for the second data object stored in the hosted storage system.

2. The method of claim 1, wherein storing the second data object includes assigning a default access control list to the second data object; and
    wherein assigning the first data object as an access control list for the second data object includes unassigning the default access control list from the second data object.

3. The method of claim 2, wherein storing the second data object with a default access control list comprises:
    storing the second data object in a bucket of the hosted storage system;
    selecting, based on the bucket, the default access control list from a plurality of access control lists; and
    assigning, after the selecting, the default access control list to the second data object.

4. The method of claim 1, wherein assigning comprises copying the first data object and using the copied data object as the access control list.

5. The method of claim 1, wherein assigning comprises storing a reference to the first data object, in association with the second data object, as the access control list.

6. The method of claim 5, the method further comprising:
    receiving, in the hosted storage system, a request to access the second data object from a user;
    accessing, in the hosted storage system, the first data object using the stored reference;
    determining, based on the first data object, that the user is permitted to access the second data object; and
    providing, to the user, access to the object.

7. The method of claim 1, wherein:
    the hosted storage system indexes the data objects stored in the hosted storage system in buckets; and
    the access control list of the first data object specifies access permissions for one or more of the buckets.

8. A computer storage medium storing a computer program, the program comprising instructions that, when executed by one or more processing devices, cause the one or more processing devices to perform operations comprising:
    storing, in a hosted storage system, a first data object comprising an access control list specifying access permissions for data objects stored in the hosted storage system, the hosted storage system providing hosted storage to a plurality of clients that are coupled to the hosted storage system;
    receiving, in the hosted storage system, a request to store a second data object;

storing, in the hosted storage system, the second data object;

receiving, in the hosted storage system after storing the second data object, a request including an indicator that the first data object stored in the hosted storage system should be used as an access control list for the second data object; and assigning, in the hosted storage system, the first data object as an access control list for the second data object stored in the hosted storage system.

9. The computer storage medium of claim 8, wherein storing the second data object includes assigning a default access control list to the second data object; and wherein assigning the first data object as an access control list for the second data object includes unassigning the default access control list from the second data object.

10. The computer storage medium of claim 9, wherein storing the second data object with a default access control list comprises:

storing the second data object in a bucket of the hosted storage system;

selecting, based on the bucket, the default access control list from a plurality of access control lists; and assigning, after the selecting, the default access control list to the second data object.

11. The computer storage medium of claim 8, wherein assigning comprises copying the first data object and using the copied data object as the access control list.

12. The computer storage medium of claim 8, wherein assigning comprises storing a reference to the first data object, in association with the second data object, as the access control list.

13. The computer storage medium of claim 12, the operations further comprising:

receiving, in the hosted storage system, a request to access the second data object from a user;

accessing, in the hosted storage system, the first data object using the stored reference;

determining, based on the first data object, that the user is permitted to access the second data object; and providing, to the user, access to the object.

14. A computer system comprising:

a hosted storage system configured to:

store a first data object comprising an access control list specifying access permissions for data objects stored in the hosted storage system, the hosted storage system providing hosted storage to a plurality of clients that are coupled to the hosted storage system;

receive a request to store a second data object;

store the second data object;

receive, after storing the second data object, a request including an indicator that the first data object stored in the hosted storage system should be used as an access control list for the second data object; and assign the first data object as an access control list for the second data object stored in the hosted storage system; and a client system configured to:

send, to the hosted storage system, the request to store the second data object.

15. The system of claim 14, wherein to store the second data object, the hosted storage system is configured to assign a default access control list to the second data object; and wherein to assign the first data object as an access control list for the second data object, the hosted storage system is configured to unassign the default access control list from the second data object.

16. The system of claim 15, wherein to store the second data object with a default access control list, the hosted storage system is configured to:

store the second data object in a bucket of the hosted storage system;

select, based on the bucket, the default access control list from a plurality of access control lists; and assign, after the selecting, the default access control list to the second data object.

17. The system of claim 14, wherein, to assign the first data object as an access control list for the second data object stored, the hosted storage system is configured to copy the first data object and use the copied data object as the access control list.

18. The system of claim 14, wherein, to assign the first data object as an access control list for the second data object stored, the hosted storage system is configured to store a reference to the first data object, in association with the second data object, as the access control list.

19. The system of claim 18, wherein:

the hosted storage system is further configured to:

receive a request to access the second data object from the client system;

access the first data object using the stored reference;

determine, based on the first data object, that the user is permitted to access the second data object; and provide, to the client system, access to the object; and the client system is further configured to:

send the request to access the second data object to the hosted storage system; and receive access to the object.

20. The system of claim 18, wherein:

the hosted storage system indexes the data objects stored in the hosted storage system in buckets; and the access control list of the first data object specifies access permissions for one or more of the buckets.

* * * * *

UNITED STATES PATENT AND TRADEMARK OFFICE
CERTIFICATE OF CORRECTION

PATENT NO.        : 8,612,710 B2                                      Page 1 of 1
APPLICATION NO.   : 13/764495
DATED             : December 17, 2013
INVENTOR(S)       : David R. Hanson and Erkki Ville Juhani Aikas It is certified that error appears in the above-identified patent and that said Letters Patent is hereby corrected as shown below:

On the Title Page; item (72),

Column 1, line 2, delete "Erkki Ville Aikas," and insert -- Erkki Ville Juhani Aikas, --, therefor.

Signed and Sealed this
Fifteenth Day of April, 2014

Michelle K. Lee
*Deputy Director of the United States Patent and Trademark Office*